(12) United States Patent
Sivakumar et al.

(10) Patent No.: US 7,218,610 B2
(45) Date of Patent: May 15, 2007

(54) COMMUNICATION SYSTEM AND TECHNIQUES FOR TRANSMISSION FROM SOURCE TO DESTINATION

(75) Inventors: Raghupathy Sivakumar, Atlanta, GA (US); Nikil Jayant, Alpharetta, GA (US)

(73) Assignee: EG Technology, Inc., Atlanta, GA (US)

( * ) Notice: Subject to any disclaimer, the term of this patent is extended or adjusted under 35 U.S.C. 154(b) by 0 days.

(21) Appl. No.: 10/254,978

(22) Filed: Sep. 26, 2002

(65) Prior Publication Data

US 2003/0067877 A1    Apr. 10, 2003

Related U.S. Application Data

(60) Provisional application No. 60/325,117, filed on Sep. 27, 2001.

(51) Int. Cl.
  H04J 1/16    (2006.01)
  H04J 3/14    (2006.01)
  H04L 1/00    (2006.01)

(52) U.S. Cl. ..................... 370/230; 370/235
(58) Field of Classification Search ........ 370/229–232, 370/235, 236, 389, 394, 400, 401, 410, 412, 370/413, 417, 465, 468, 252, 253
  See application file for complete search history.

(56) References Cited

U.S. PATENT DOCUMENTS

| | | | | |
|---|---|---|---|---|
| 4,769,815 A | * | 9/1988 | Hinch et al. | 370/236 |
| 4,942,569 A | * | 7/1990 | Maeno | 370/230 |
| 5,400,329 A | * | 3/1995 | Tokura et al. | 370/232 |
| 5,442,750 A | | 8/1995 | Harriman, Jr. et al. | |
| 5,487,061 A | * | 1/1996 | Bray | 370/252 |
| 5,506,903 A | | 4/1996 | Yamashita | |
| 5,521,907 A | | 5/1996 | Ennis, Jr. et al. | |
| 5,633,861 A | * | 5/1997 | Hanson et al. | 370/232 |
| 5,699,519 A | * | 12/1997 | Shiobara | 709/235 |
| 5,729,530 A | * | 3/1998 | Kawaguchi et al. | 370/236 |
| 5,764,641 A | * | 6/1998 | Lin | 370/412 |
| 5,892,754 A | * | 4/1999 | Kompella et al. | 370/236 |
| 6,041,039 A | * | 3/2000 | Kilkki et al. | 370/230 |
| 6,046,985 A | * | 4/2000 | Aldred et al. | 370/252 |
| 6,052,379 A | * | 4/2000 | Iverson et al. | 370/442 |
| 6,097,697 A | * | 8/2000 | Yao et al. | 370/230 |
| 6,169,748 B1 | | 1/2001 | Barbas et al. | |
| 6,198,750 B1 | | 3/2001 | Buchholz et al. | |
| 6,707,821 B1 | * | 3/2004 | Shaffer et al. | 370/395.4 |

\* cited by examiner

*Primary Examiner*—Huy D. Vu
*Assistant Examiner*—Daniel J. Ryman
(74) *Attorney, Agent, or Firm*—Needle & Rosenberg, P.C.

(57) ABSTRACT

A system and method for communicating between source and destination transmission and presentation of streaming digital information signals can be uses to optimize performance in the context of the contentions among different dimensions of performance including goodput, throughput, delay, receiver buffer requirements and tolerance to loss and jitter. The system provides ordering segments of information based on a priority associated with each of the segments of the information; managing of flow of the segments into and out of a buffer based on the priority of the segments of information; adjusting a rate at which information is provided to a communication medium; and transmitting the information.

39 Claims, 11 Drawing Sheets

COMMUNICATION SYSTEM AND TECHNIQUES FOR TRANSMISSION FROM SOURCE TO DESTINATION

This application claims the benefit of U.S. Provisional Patent Application No. 60/325,017 filed on Sep. 27, 2001, which is hereby incorporated by reference for all purposes as if fully set forth herein.

BACKGROUND OF THE INVENTION

1. Field of the Invention

The present invention relates to a system and method for transmitting signals, and more particularly, the present invention relates to a system and method for transmitting and receiving time sensitive, not fully reliable digital signals between a source and a receiver.

2. Discussion of the Related Art

Time sensitive, not fully reliable digital signals include single-media and multi-media data streams, including audio, audio and graphics, video, and synchronized audio and video data. As discussed herein, the concepts of the present invention are applicable to any system of streaming digital information from at least one sender to at least one receiver in which the data transmission is time sensitive but does not require the fidelity provided by full reliability. In addition, the data or information in the transmission may have a priority scheme, e.g., multiple priorities assigned to different portions, such as packets, of the data or information (e.g., heterogeneous priority).

For example, multimedia data are presented to a user in a time critical way. For example, the auditory experience of the user is hindered if the data are presented too slowly or in an incorrect order. If presented too slowly, the user may hear a lower frequency voice than belongs to the speaker, which decreases the fidelity of the presentation. The decreased fidelity diminishes the utility of such audio data as music. In the case of speech, if data are dropped out or swapped in sequence, the user may be unable to determine what the speaker is saying, which decreases the utility of the communication. As another example, the visual experience of the user is hindered if the video data are presented out of sequence or out of synchronization with the audio data. Out of sequence video data at time scales longer than transmission time for one frame causes smooth motion to become zigzagged as frames are shown out of sequence, destroying the utility for motion critical video such as dance, sporting events, and scientific research. Out of sequence video data on shorter time scales causes portions of single frame to be presented at incorrect spatial positions on a display screen, so that the image is at best distorted or, at worst, unrecognizable.

Multi-media data takes many forms known in the art. For example, audio data are stored as files of binary data using various formats. In some formats, the data are compressed so that the number of binary digits (bits) when stored in the file is less than the number of bits used during presentation to a human observer. Example image formats, often indicated by extension on the names of the files used to store their data, include GIF, JPEG, TIFF, bit map (BMP), CGM, DXF, EPS, PCX, PDF, PIC, among others. Example audio formats, often indicated by extensions on the names of the files used to store their data, include waveform audio (WAV), MP3, audio interchange file format (AIFF), unix audio (AU), musical instrument digital interface (MIDI), and sound files (SND), among others. Example video formats, often indicated by extensions of the names of the files used to store their data, include QuickTime, AVI and the Motion Picture Experts Group format (MPEG), among others. Further treatment of the subject is provided in the book *Video Communication,* (1) *Image and Video Compression Standards,* V. Bhaskaran and K. Konstantinides, Kluwer Academic, 1995.

To allow a plurality of complex systems to communicate, a common set of standards has been established that system and component manufacturers have agreed to use in their systems and components. These standards relate to a basic set of functions. Among the functions, and at the most basic level, is the communication function and the rules, or protocols, for exchanging information. The applicable standard depends on the syntax of the data and the network or system over which the data is sent, for example, MPEG, Cable, Internet, etc. For example, two well-known Internet protocols are the Transmission Control Protocol (TCP) and the User Datagram Protocol (UDP). The principles of the present invention are applicable to any such system, regardless of the underlying protocols.

TCP includes a feedback loop that allows for full reliability. TCP guarantees delivery of data and also guarantees that packets will be delivered in the same order in which they were sent. TCP attempts to recover from packet losses by allowing for multiple retransmissions of packets as indicated by the feedback information and adjusts the sending rate dynamically if it perceives packet losses. However, the trade-off for minimizing packet losses is an inherent delay caused by the retransmission process. Thus, TCP is particularly slow for multimedia transport; for example, video transmission is slow if TCP is used. In fact, systems using TCP under loss conditions can "lock up" so that the user does not see or hear streaming information, thus compromising quality of service. The delay between sending a data packet from a server and receiving the packet at a client is called network latency. TCP is a good protocol for high-latency-tolerant data traffic requiring full reliability.

UDP has no reliability mechanisms, no feed back loop, and provides choppy video transmission. Because UDP is so unsophisticated (or "dumb"), UDP incurs no delay, but does not permit retransmission. UDP is better suited for communications that are not tolerant of high latency. For example, UDP is often used for broadcast transmission.

Applications have been adapted to improve the display quality of streaming signals transmitted over a network such as the Internet or Cable. However, such applications still do not provide high quality display because of the inherent problems in transmission when available bandwidth is limited.

SUMMARY OF THE INVENTION

Accordingly, the present invention is directed to a system for communication of data that substantially obviates one or more of the problems due to limitations and disadvantages of the related art.

An advantage of the present invention is to provide transmission and presentation of streaming digital information signals that optimizes performance in the context of the contentions among different dimensions of performance including goodput, throughput, delay, receiver buffer requirements and tolerance to loss and jitter.

Another advantage of the present invention is to maximize reliability and to minimize latency.

Another advantage of the present invention is to adjust dimensions of performance in view of user experience and requirements.

Another advantage of the present invention is to provide a technique for fast detection of loss of a transmitted signal.

Another advantage of the present invention is to provide proactive buffer management at either transmitter or intermediate nodes.

Another advantage of the present invention is to provide a technique for rate control or congestion control in a constant bit rate environment.

Another advantage of the present invention is to provide a technique for rate control or congestion control in a variable bit rate environment.

Another advantage of the present invention is to provide an interactive signal or feedback to a sender to indicate quality of service requirements of a receiver.

Another advantage of the present invention is to provide a dynamic prioritization of the attributes to particular data depending upon the progress of the connection.

The system adaptation and techniques according to the present invention are beneficial for both non-legacy and legacy systems. System adaptation and techniques according to the present invention can be made at the application or the transport layer of source and client nodes and possibly at the network or data link levels in routers or other nodes. Adaptation at levels other than the application layer (e.g., the transport layer) are beneficial for legacy applications because fine grained adaptation is possible while not affecting any legacy application. Such adaptation differs from conventional adaptation, which can be performed at the application layer only and hence can adapt only in a coarse-grained fashion and also cannot be used to improve the performance of a legacy application.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for providing digital communication, includes ordering segments of information based on a priority associated with each of the segments of the information; managing of flow of the segments into and out of a buffer based on the priority of the segments of information; adjusting a rate at which information is provided to a communication medium; and transmitting the information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
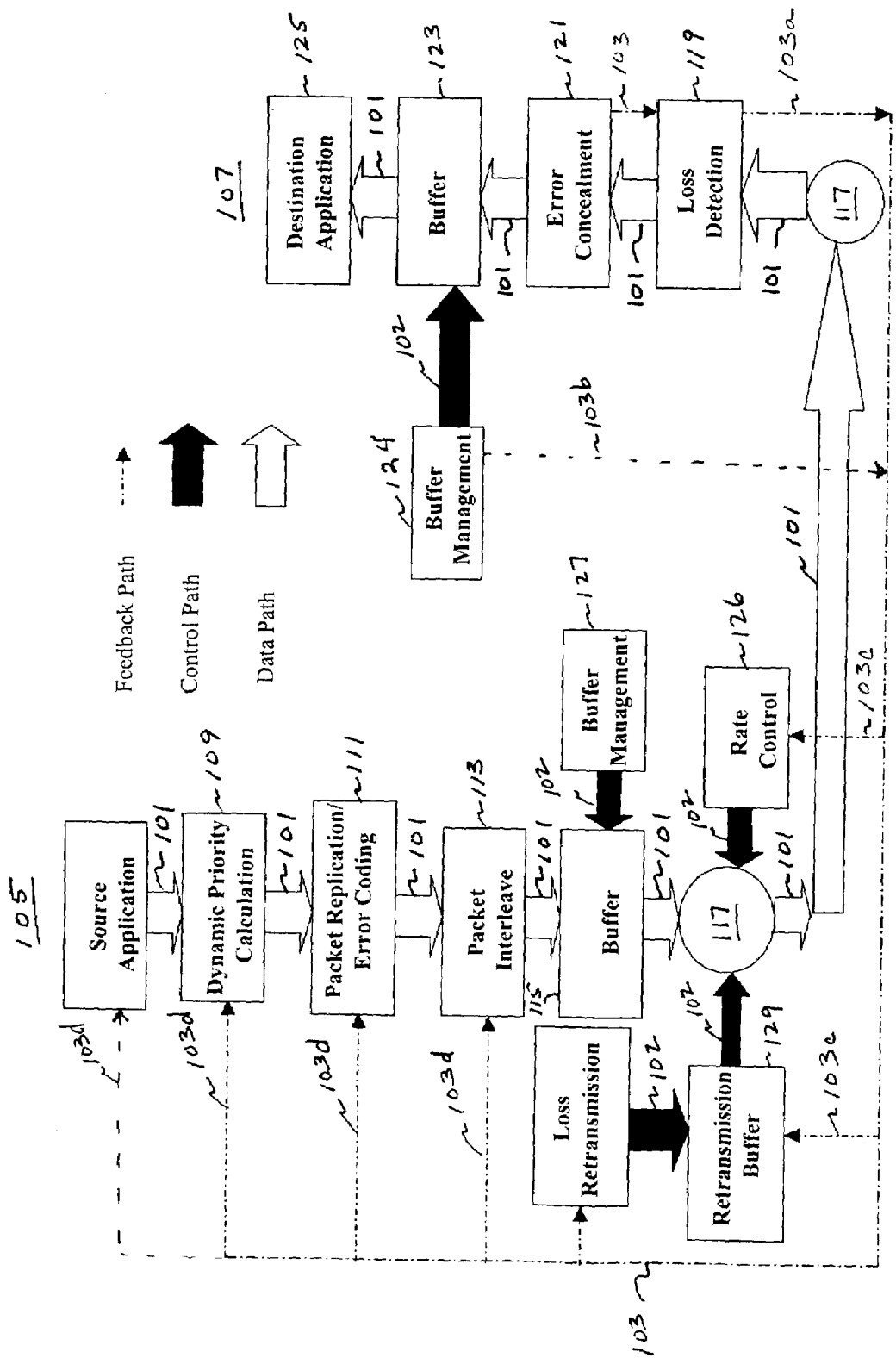
FIG. 1 illustrates an exemplary flow of signals according to one embodiment of the present invention.

FIG. 1 illustrates an example of data flow 101, a control path 102 and feedback 103 using present system from the sender 105 to the receiver 107 and from the receiver 107 to the sender 105 according to the present invention. Each of the paths will be discussed with respect to FIG. 1.

The data flow path 101 is from the sender 105 to the receiver 107. The flow of the data is affected by any of a number of operations at the sender side 105 or the on the receiver side 107. Also, the type of data can influence the various operations performed on the data.

Again, referring to FIG. 1, a priority order assigned to the data is assigned according to an expert system 109 on the sender side 105. The sender side 105 may also replicate 111 important data or data packets for transmissions along the data path 101 based on the priority assigned by the expert system 109. Also, packet interleaving 113 is performed on the sender side 105 and may be performed according to priority assigned by the dynamic prioritization expert system 109. Other techniques for error correction coding may also be applied. Data is buffered 115 and placed on a transmission medium, e.g., on an open network such as the Internet, on a closed network such as a wide area or local area network, on a broadcast system or on a point to point system, or the like. Typically, the data is passed through an interface 117, such as a network interface, before being placed on the transmission medium.

At the receiver side 107, the data is typically received via an interface 117, such as a network interface, from the transmission medium. At the receiver side 107, loss detection 119 is performed. Also, if the capability is available, error concealment 121 is performed on the data flow 101. The data is buffered 123 and provided to the receiver side application 125 for use by a user.

Each of the operations performed on the data in the data path 101 can be affected by any of a number of operations such as prioritization 109, replication111, interleaving 113 and buffering 115, among other operations not described here, but known to those of skill in the art, including error coding or similar operations. According to the present invention, the operations performed on the data are adaptable based on feedback and controls between and among the receiver 107 and the sender 105. These operations can be performed singly or in any combination or order.

The feedback path 103 is shown as a dotted line in FIG. 1. At least three types of feedback from the receiver/destination 107 are useful in improving the quality and reliability of data transmission according to the present invention. For example, there are signal/data feedback such as whether a signal was actually received, network feedback such as available bandwidth, and receiver feedback such as buffer overflow at the receiver.

As shown in FIG. 1, receiver feedback 103*a* includes information about whether the receiver has an error concealment function that can compensate for losses in the data transmitted from the sender 105. Data loss detection feedback is provided to the sender only if error concealment 121 cannot compensate for information lost. Error concealment 121 can be performed by interpolating the data actually received to estimate the data not received. Buffer management feedback 103*b* is provided to prevent buffer overflow at the receiver such that information is lost because the buffer must discard data that does not fit into the buffer at the receiver. The buffer manager 124 actively monitors buffer activity at the destination. In most cases, receiver feedback 103*d* will be empirical data about actual losses in the data received by the receiver or destination application 125. The use of the receiver feedback will be discussed with respect to sender side 105.

Network feedback 103*c* includes bandwidth availability information that is used by the sender to adjust the rate at which data or data packets are placed on the network or transmission medium at the network interface, i.e., rate control 126. The rate at which data or data packets are placed on the network or transmission medium is the rate at which the buffer is drained, if the buffer 115 is populated with information. A buffer management algorithm 127 can adjust the drain rate of the buffer 115 according to the rate at which the application provides information to the buffer 115 and according to the bandwidth availability information from the network feedback 103*c*. The buffer management algorithm 127 can also drop information according to apriori information about the data priority, the buffer characteristics or the network characteristics.

Signal feedback 103*d* may be provided actively, for example, for each block of data transmitted, a signal is sent back to the sender to indicate that the block was received or not received. However, such feedback can take up valuable bandwidth or induce time delay while the sender evaluates the feedback before compensating for lost data. Therefore, while a positive feedback signal may be used, a negative feedback signal is preferred. That is, the receiver only sends a feedback signal that it did not receive a data block or packet or a portion of a data block packet, but the receiver does not send any signal if the data is received without loss. In addition, even if the system does not receive a portion of data, but the error can be effectively concealed at the receiver, a negative acknowledgement feedback signal does not need to be provided to the sender.

Signal feedback 103*d* can be provided to any of the various operations performed on the server side. For example, priority assigned by the dynamic prioritization algorithm according to the rate at which information is being lost. The degree of packet replication can be increased or decreased to compensate for the loss rate on the system. Also, the sender can retransmit replicated packets or blocks when a feedback signal from the receiver indicates that data has been lost.

The sender 105 may have a separate retransmission buffer 129 for buffering data according to the dynamic priority scheme. The retransmission buffer 129 may also be part of the main buffer for buffering the data flow that is transmitted.

Figure 2:
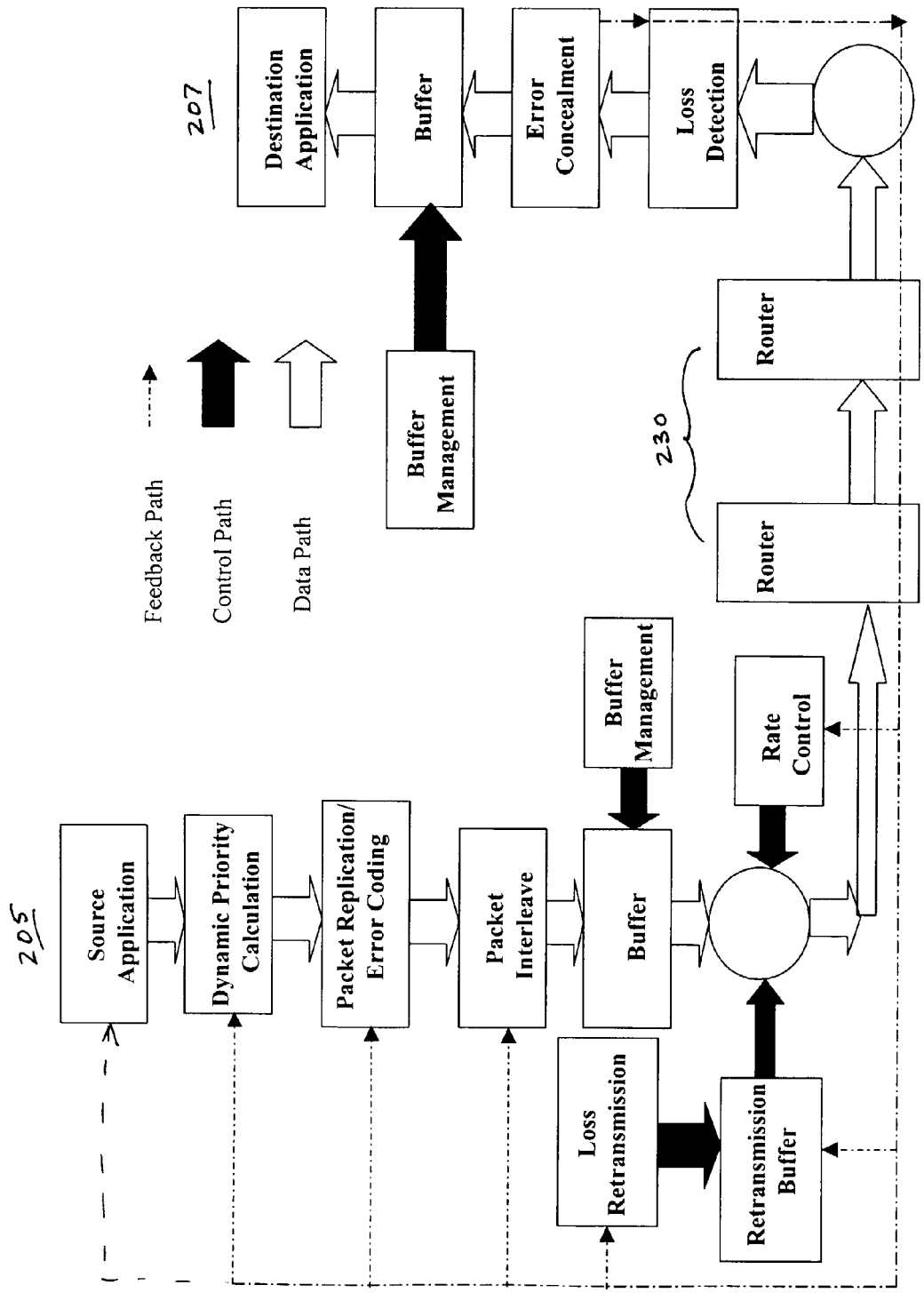
FIG. 2 illustrates an exemplary flow of signals according to another embodiment of the present invention.

As illustrated in FIG. 2, intermediate routers 230 may be in the path between the source 205 and destination 207. As will be discussed with reference to FIGS. 3–8, the intermediate routers may have varying degrees of functionality of the source and destination included.

Figure 3:
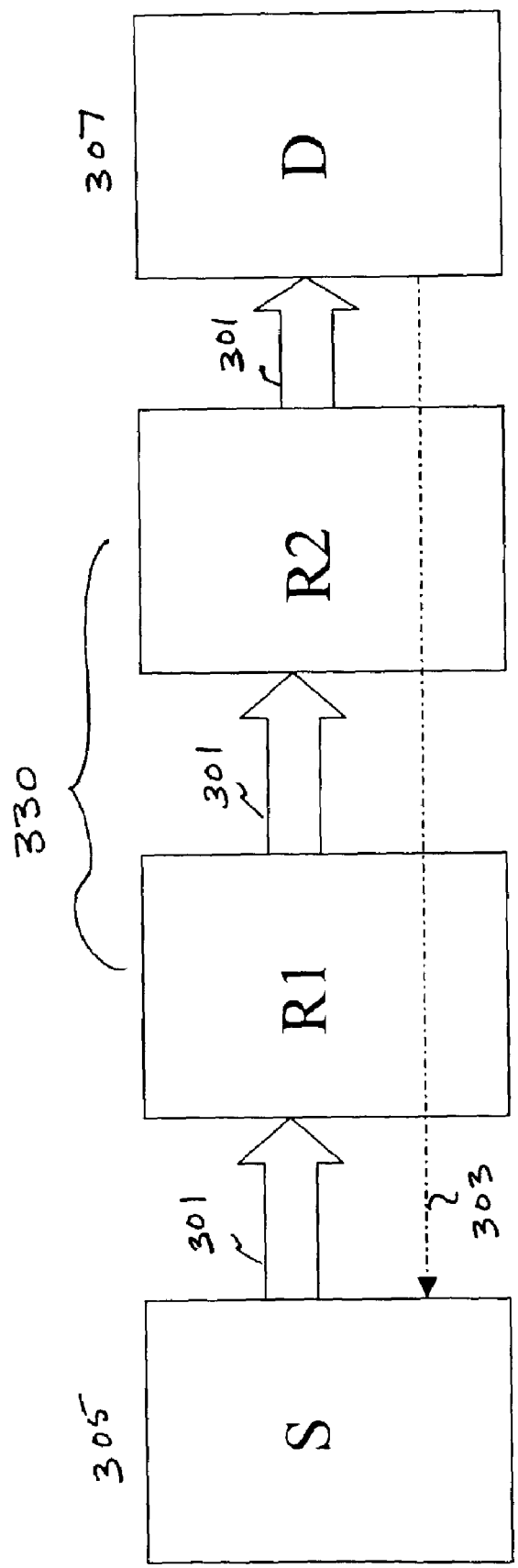
FIG. 3 illustrates an exemplary router configuration according to another embodiment of the present invention.
Figure 4:
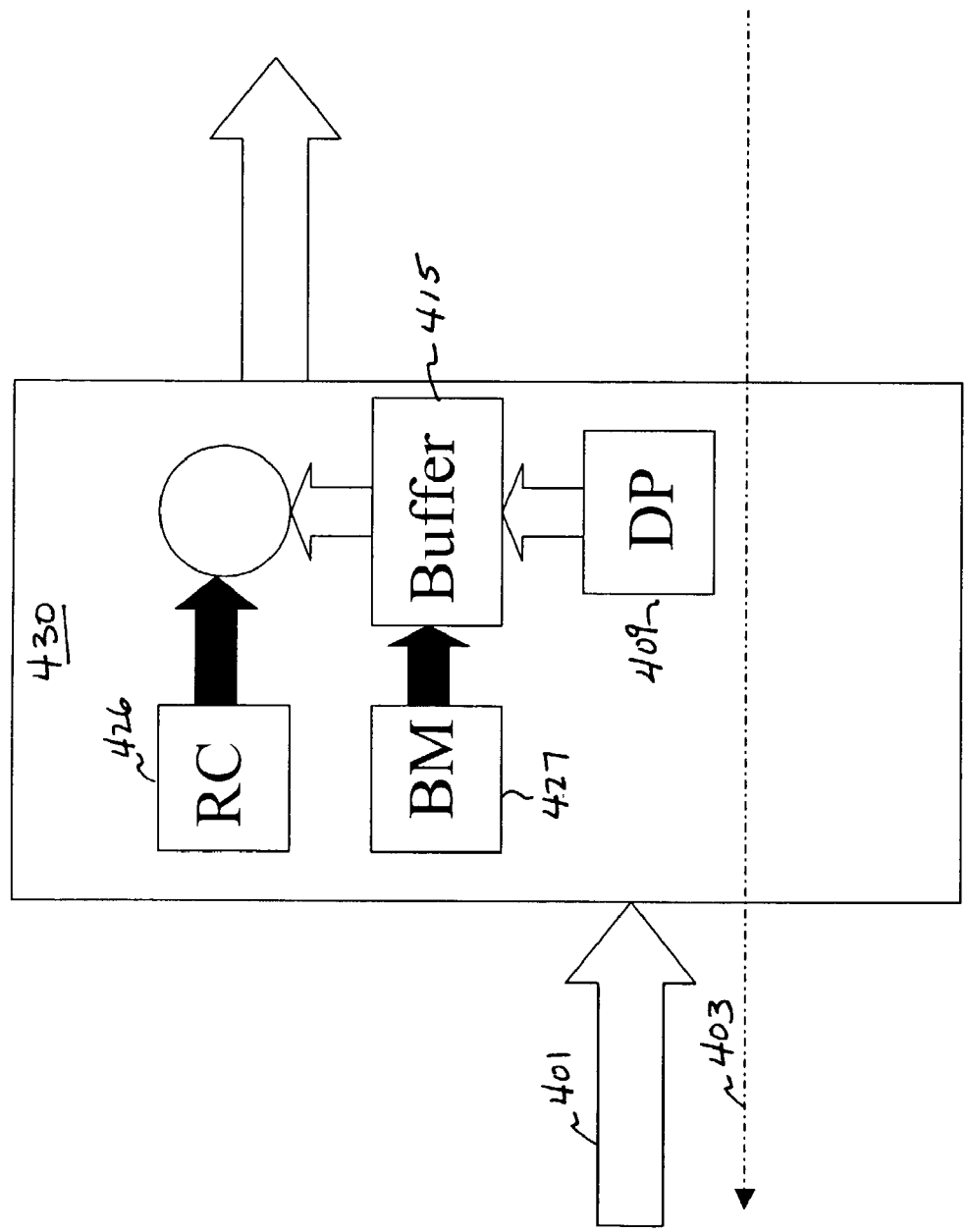
FIG. 4 illustrates exemplary router component functionality according to another aspect of the present invention.

In the router configuration illustrated in FIG. 3, the routers 330 do not respond to any of the feedback between the destination 307 and the source 305. As illustrated in FIG. 4, the router configuration illustrated in FIG. 3 may include dynamic priority 409, buffer 415 and buffer management 427, and rate control 426 according to the present invention.

Figure 5:
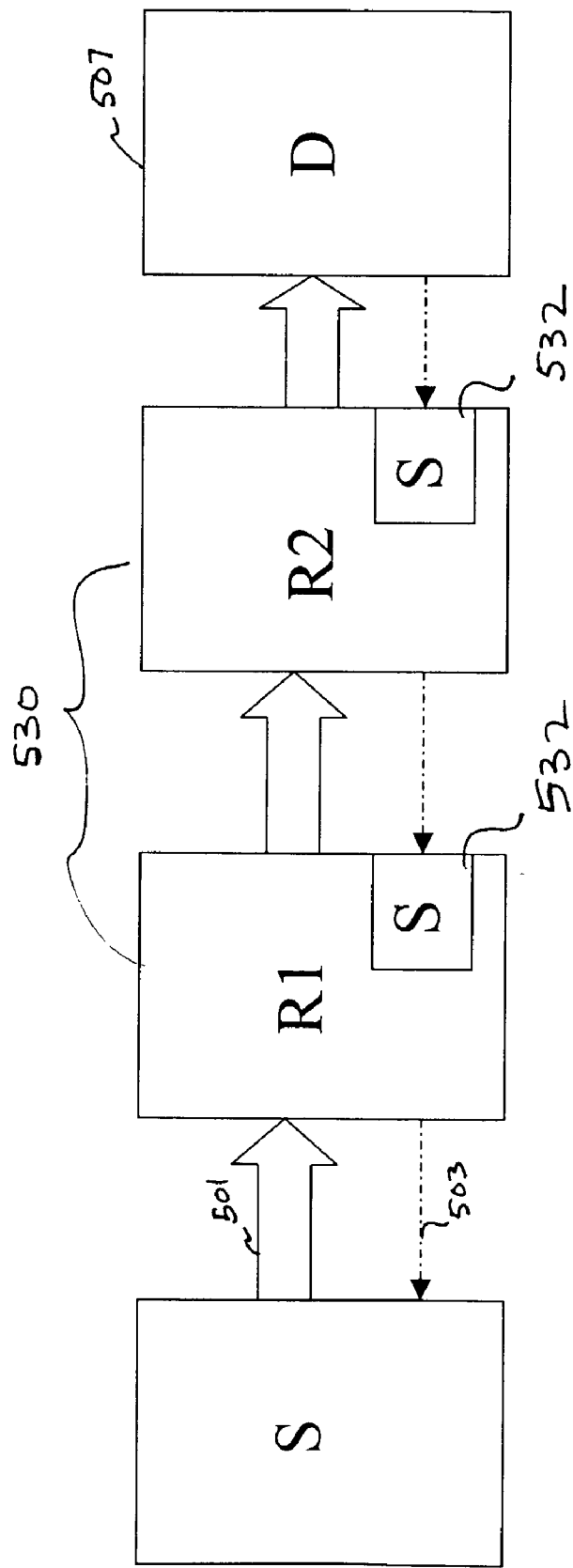
FIG. 5 illustrates an exemplary router configuration according to another embodiment of the present invention.

In the router configuration illustrated in FIG. 5, the routers 530 may include the source components 532 of the present system so that the routers 530 can adapt based on feedback from the destination 507 or from a router 530 that is upstream and therefore can be adjusted based on feedback from an upstream router or the destination. For example, as illustrated in FIG. 6, the router illustrated in FIG. 5, may include dynamic prioritization 609, packet replication 611, packet interleaving 613, buffer 615 and buffer management 627, rate control 626, and loss retransmission 616, as in the source according to the present invention.

Figure 6:
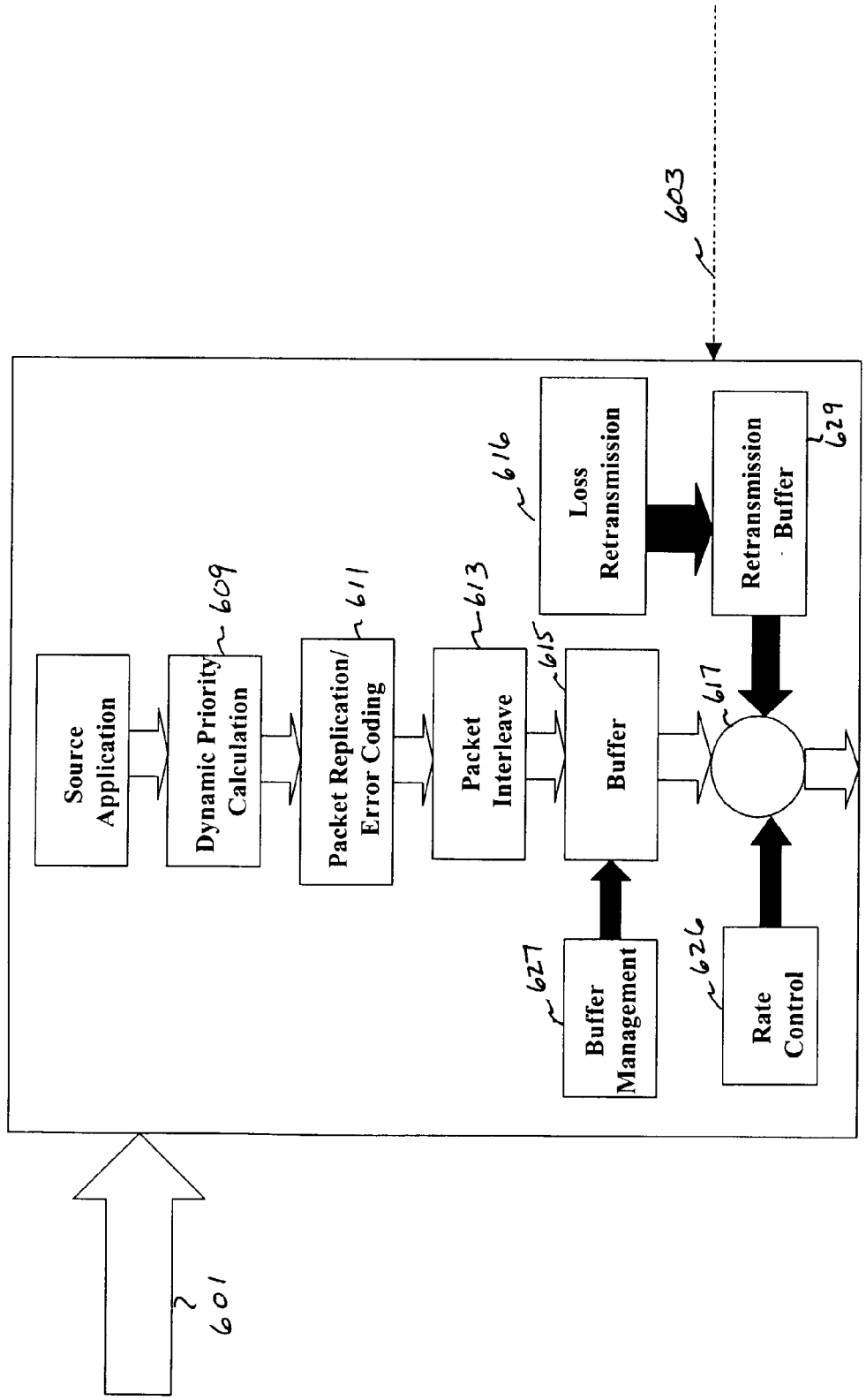
FIG. 6 illustrates exemplary router component functionality according to another aspect of the present invention.
Figure 7:
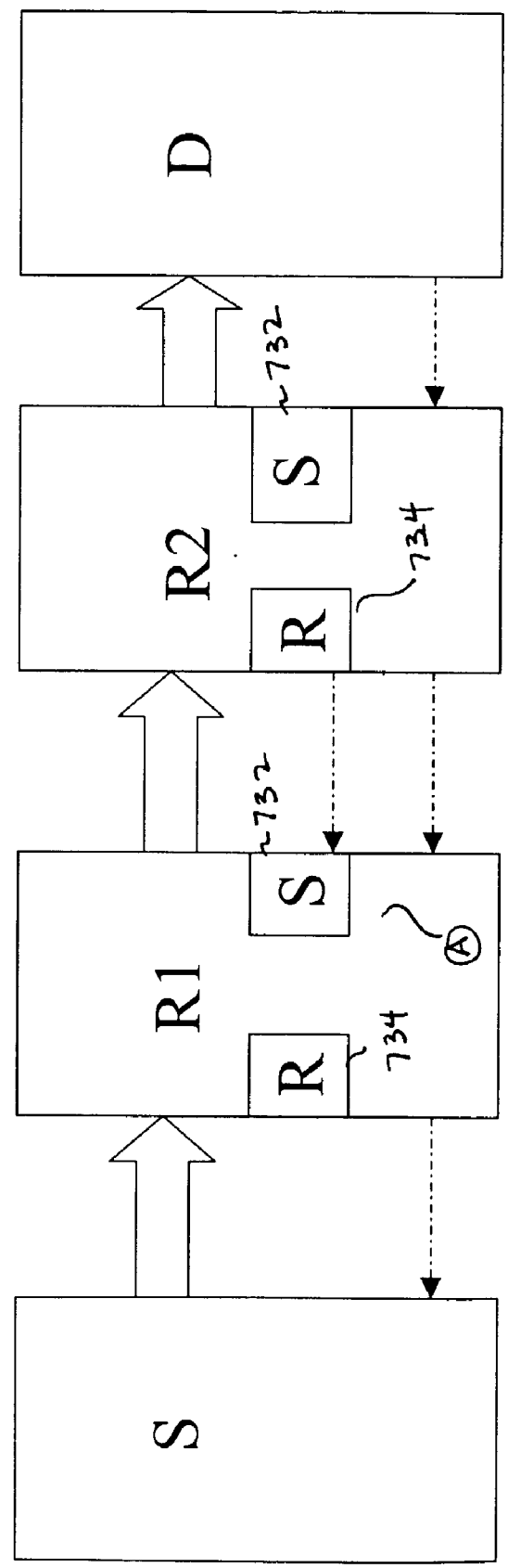
FIG. 7 illustrates an exemplary router configuration according to another embodiment of the present invention.
Figure 8:
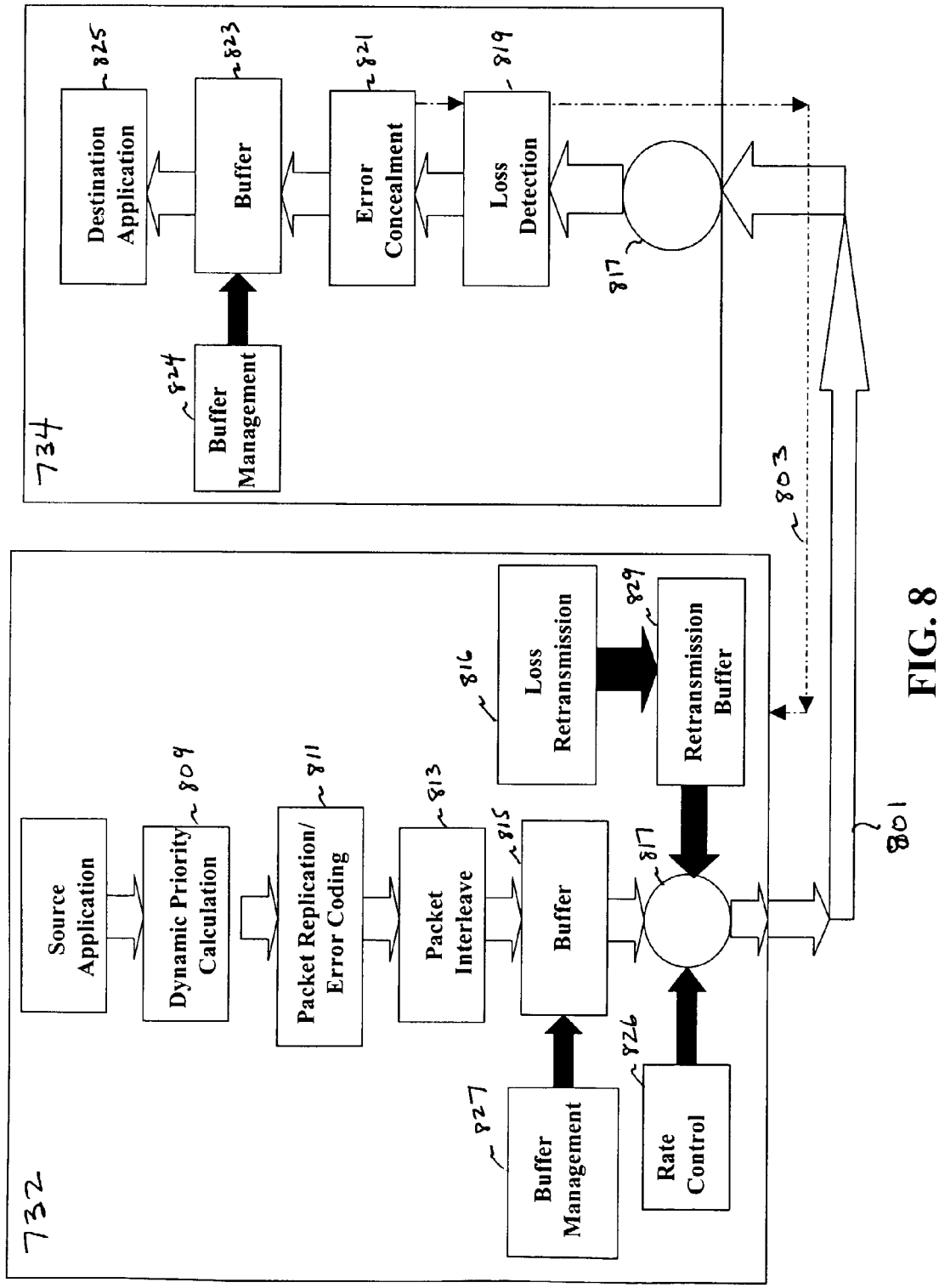
FIG. 8 illustrates exemplary router component functionality according to another aspect of the present invention.

In the router configuration illustrated in FIG. 7, the routers 730 may include the source components 732, as described with respect to FIGS. 5 and 6, and also include receiver components 734 of the present system so that the router 730 can adapt based on the data from a downstream router R2 or destination 707. For example, as illustrated in FIG. 8, the router R1 on the upstream side may include source components 732, such as, dynamic prioritization 809, packet replication 811, packet interleaving 813, buffer 815 and buffer management 827, rate control 826, and loss retransmission 816 as in the source 705 according to the present invention. In addition, for example, the router R2 on the downstream side may include receiver components 734 according to the present invention, such as fast loss detection 819, error concealment 821, and buffer 823 and buffer management 824.

A statistical multiplexer (Stat Mux) can also implement with any and all of the features as discussed above with respect to intermediate routers.

Figure 9:
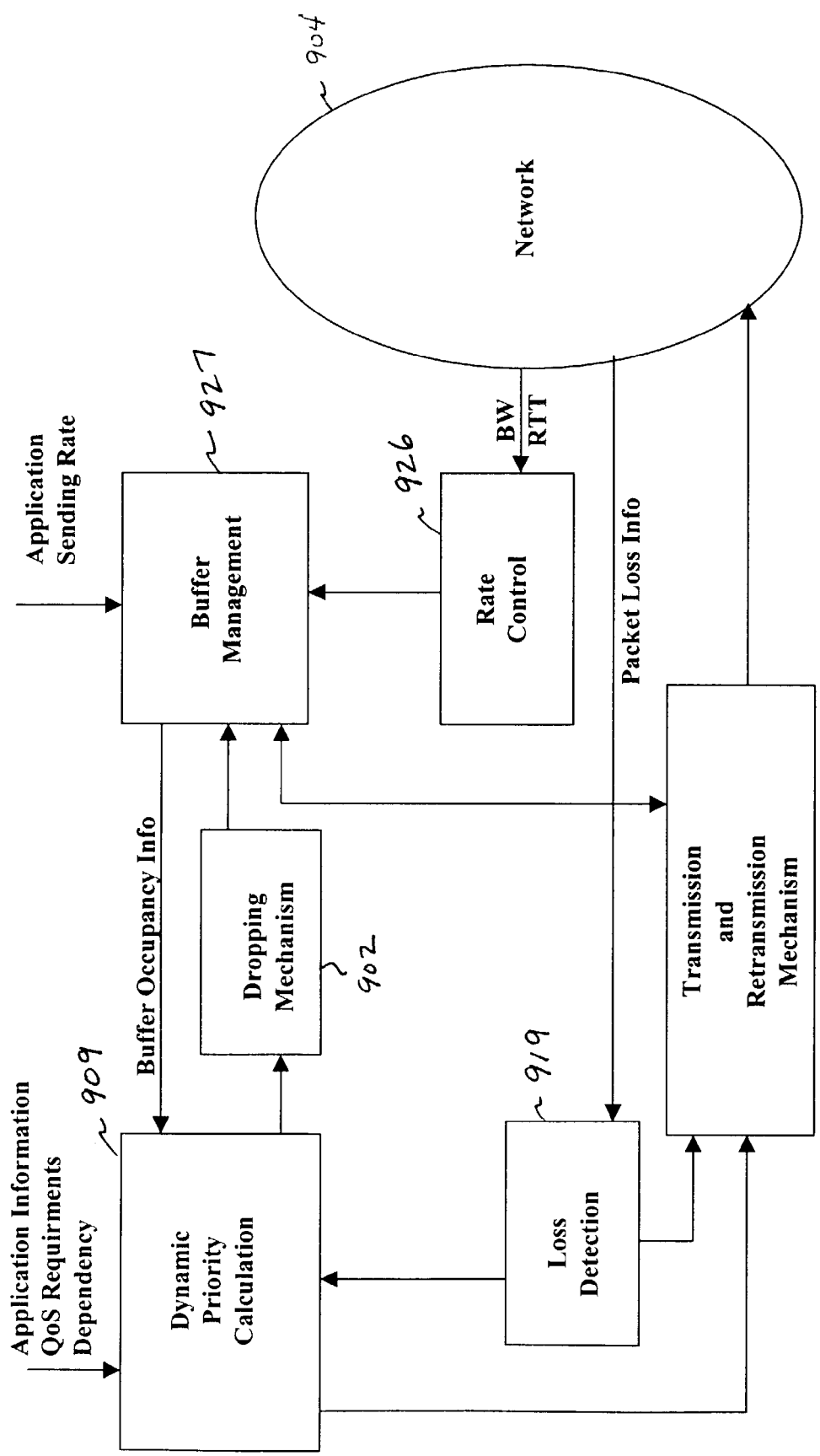
FIG. 9 illustrates a block diagram of basic operations performed to optimize the performance of the system according to one embodiment of the present invention.

Several of the operations performed in the architecture of an exemplary architecture according to the present invention will be discussed with respect to FIG. 9. FIG. 9 is a flow diagram illustrating the operations performed on the receiver and server sides. As can be seen in the figure, the operations in the present system architecture interrelate to one another and the system adapts according to the information flowing between the operations.

Initially, the prioritization is set based on the initial encoding of the signal. The dynamic priority calculation 909 also can take into account the application information at the client device and service requirement information from the user. The prioritization scheme that results from the dynamic priority calculation 909 is provided to a transmission/retransmission mechanism 902 that will request transmission or retransmission via a network 904. In other words, the data may be prioritized according to a plurality of application, network and signal attributes. When a loss of data occurs, the system may retransmit the data as appropriate or drop the data as appropriate, depending on the prioritization or attributes.

A loss detector 919 determines whether a signal received over the network 904 includes information losses. As discussed above, the loss information may be provided to the dynamic priority calculation 909. After the initial prioritization when transmission begins, the dynamic priority calculation 909 is revised to include the loss information from the loss detector 919. Dynamic priority calculation 909 according to the present invention will be discussed in greater detail below.

One method for providing loss detection information to the server is to provide only negative loss information for data in which errors cannot be concealed. So, the only signals that are reported as lost to the server are those that cannot be concealed at the receiver. A positive acknowledgement for other data is assumed. For example, if two negative acknowledgments are received for first and third data packets sent, but no negative acknowledgment is received for the second data packet, then it is assumed that the second data packet was not lost. Loss detection according to the present invention will be discussed in greater detail below. Some positive acknowledgement at coarse granularity can be used to recover from losses of negative acknowledgements.

A signature profile sent by the sender to the receiver, perhaps as a signal header, provides information to the receiver about the time synchronization of the signal being transmitted. In other words, the receiver knows when to expect a data packet in the signal stream based on the signature profile, which can be thought of as time signature and/or priority signature for packet or data receipt.

As discussed above, the network 904 also provides information as to bandwidth and transmission rate. The rate or bandwidth information is taken into account in rate control 926 and buffer management 927, which includes a mechanism for dropping low priority data 902. Buffer management 927 is required if the transmission rate exceeds the network transmission rate. The buffer manager can predict in advance if there is going to be a data overflow based on information in the signature profile. Buffer management according to the present invention will be discussed in greater detail below.

According to the present invention, a plurality of inventive techniques may be used to optimize transmission of information in a network environment. Various aspects of these techniques are discussed in details as follows.

Loss Detection

It is always desirable to have knowledge of a packet drop inside the network as soon as possible. This is more so in a video streaming application as information is time sensitive. Most mechanisms for loss detection rely on a time out at the sender (which is a coarse estimate of the time taken for an acknowledgment to come back from the receiver). However, such timeouts, being coarse, introduce a delay into the packet stream that can result in large buffer requirements or alternatively larger over-provisioning of bandwidth.

One method for providing loss detection information to the server is to provide only negative loss information for data in which errors cannot be concealed. So, the only signals that are reported as lost to the server are those that cannot be concealed at the receiver. A positive acknowledgement for other data is assumed. For example, if two negative acknowledgments are received for first and third data packets sent, but no negative acknowledgment is received for the second data packet, then it is assumed that the second data packet was not lost.

The present system provides loss detection much faster than conventional systems. In conventional systems, the sender expects to receive positive acknowledgement of a signal from the receiver at a certain time. If the source has not received the expected acknowledgement by the certain time, the sender continues to wait for some additional time period to see if it receives the acknowledgement. Only after the additional time period does the sender of the conventional system accept that the signal is lost and take measures to compensate for the lost signal, such as performing a retransmission, if necessary.

In the loss detection of the present system, the waiting period is dynamically tuned based on the priority of expected data. A signature profile in advance of the information signal may provide time synchronization information (codes) and priority information (priority profile) about the signal to be received, including when a signal is to be expected. The signature profile also provides information to the receiver about inter-packet separation time (IPS) if the traffic is variable bit rate. IPS between any two consecutive packets can be different. Such IPS information is provided by the signature profile. Based on the signature profile, the receiver knows when to expect a signal and when to expect the subsequent signal. That is, if a first signal is expected at $t_1$, then the next signal is expected at $t_{1+I}=t_I+IPS_I$. In the loss detection according to the present system, when time $t_{1+I}$ is reached, but the expected signal has not been received, then the receiver takes action to compensate for the lost signal.

Generally, loss detection of the present invention is more aggressive in proportion to the priority of a packet in a heterogeneous priority system. In general, the relationship between reporting of a loss and the packet priority is a monotonically non-increasing function.

In some systems, packets arrive in a periodic stream with a certain fixed or variable IPS between packets. In file transfer, for example, packets may be transferred back to back with little or no EPS. However, packet arrival timing and interpacket separation may be determined by actual monitoring of the packet stream over time, e.g., by empirical data. After empirical sampling, the system can adjust for an interpacket separation that can vary because the available transmission rate changes.

An exemplary client side loss detection algorithm makes use of intelligence provide by the signature profile.

At the beginning of the connection lifetime, the sender sends across to the receiver the signature profile. The signature profile may include time stamp information and/or priority information according to whether the signal is constant bit rate or variable bit rate and to whether the signal has homogeneous or heterogeneous priority. If the signal is constant bit rate, then only the streaming rate R and the packet length L is included instead of time stamp information in the signature profile.

The priority profile indicates the list of priorities for the packets to be streamed. For example, let $p_1$ be the priority for the first packet.

After the receipt of the $i^{th}$ packet, the client waits, for example, $$T_w = c1 * f_x(L/R) + c2 * f_y(K(p_{1+I})) * f_z(\text{dev}(J))$$

before it sends a negative acknowledgement (NACK) to the sender.

The parameters in the expression are as follows:

$K(p_{1+I})$ is a constant specific to the priority level for the expected packet.

$$K(x) > K(y) \text{ if, and only if, } x < y$$

That is, for a high priority packet, K(p) will be low, making the client send the NACK faster to the sender.

Thus, faster feedback is given to the sender and at the same time, spurious retransmissions are prevented for low priority packets.

Another aspect of the loss detection of the present system, a start up delay is provided to allow for jitter compensation and retransmission time when a loss is detected and retransmission is requested. The start up delay depends on buffer size. The variable loss detection as described above minimizes the start up delay requirements by requesting retransmission faster and limiting the retransmission requests to higher priority information. Such advantages are particularly helpful in systems having a fixed buffer size or where users require a smaller start-up delay.

While this "fast" lost detection system is described for use in systems having information having heterogeneous priority, such loss detection is also applicable to data systems having no priority scheme.

This "fast" loss detection can also be used in systems having selective acknowledgement of received signals, such as in a traditional Internet environment. The "fast" loss detection can also be used in conjunction with error concealment techniques.

Buffer Management

The present system includes active buffer management both at the source and the receiver. Buffer management at the receiver will be discussed with respect to flow control.

On the source side, a buffer manager monitors the fill rate of a buffer before the interface between the source and the network. The buffer manager monitors whether the buffer overflows or is about to overflow. In this system, if the rate that data is output is sufficiently greater than the fill (input) rate of the buffer, the buffer remains empty, and there is no need for buffer management. It is possible that, for small time periods, the output rate is greater than the fill rate, and for other periods of time that the input rate is greater than the output rate, so the buffer management may be necessary. If the output rate onto the network is equal to or less than the fill rate of the buffer, there needs to be buffer management, and information may need to be dropped before it is placed on the network. In typical systems, the next packet to be placed in a filled buffer is dropped without regard to the importance of the information contained in the packet. However, the present system takes into account the priority or importance information related to the information in the buffer and the information that needs to be placed in the buffer. A rate control algorithm controls the output rate.

Priority drop removes lower priority packets from the queue if higher priority packets needs to be buffered.

Proactive drop predicts a loss in advance based on the expected timing of receipt of information having different priorities and on the current estimate of the output rate as determined by the rate control component. If a loss is predicted, it drops lower priority information even if the buffer is not yet full. In some systems, the proportion of priorities in an information stream does not fluctuate. Using this information, the buffer manager can predict what the priority of the next incoming information will be and can determine if the buffer is able to receive all of the higher priority information. If the buffer predicts the loss of information that have priority higher than some of the packets in the buffer, the buffer manager will instruct the buffer to drop a number of lower priority packets from the buffer to accommodate the incoming higher priority information. This drop instruction can be given to the buffer even if the buffer is not full if the amount of predicted high priority incoming information warrants such a drop.

Even if the priority profile of an information stream does fluctuate, the signature profile can provide sufficient information for proactive buffer management and predict packet receipt. In addition, the buffer manager may know from its own information or by notice from another system, e.g., the rate controller, that the buffer will overflow. For example, the buffer manager can predict the priority of the information in the buffer when a high priority packet P is expected. If the buffer manager predicts that the only information in the buffer when the high priority packet P is received are packets $P_X$ of the same priority or higher priority than the high priority packet P, the buffer manager can instruct the buffer in advance to drop lower priority packets to allow the higher packets $P_X$ in the buffer not to be dropped and to be transmitted earlier than they would have been otherwise.

Such proactive drop is particularly applicable to any data scheme that has heterogeneous priority.

Flow Control

Buffer management at the receiver allows for flow control. That is, if the receiving rate at the destination changes for whatever reason, the buffer will fill at a changed rate. The buffer manager will detect the different fill rate at the receiver and can provide feedback to the source that the send rate should be adjusted. In other words, the buffer at the receiver is actively monitored in order to prevent overflow.

Rate Control

Rate control is different depending on the environment. For example, rate control in a public domain Internet is different from rate control in a private domain network. Within public domain Internet rate control, rate control in a constant bit (digital) rate environment is different than rate control in a variable bit rate environment. In a constant bit rate environment, information is provided at a constant rate that is the average rate that can be provided by the system. Such rate control is source friendly and TCP friendly. That is, the source can send at a constant rate.

While most of the current Internet traffic runs atop the TCP transport layer protocol, the advent of other traffic types such as multimedia has necessitated non-TCP based transport layer algorithms especially for the problem of congestion control. At the same time, in order to remain fair to the existing majority of TCP flows, it is required for these new algorithms to still exhibit "TCP friendliness". In other words, if a non-TCP congestion control algorithm is used by a connection, it has to be ensured that the long-term average rate enjoyed by the connection is the same as what a TCP flow would have enjoyed under the same settings. Several such algorithms have been proposed for constant bit rate ("CBR") traffic that provide non-fluctuating (on shorter time scales) rate while at the same time remaining TCP friendly. Examples of such algorithms include binomial congestion control (BCC), TFRC (TCP friendly rate control), etc. Such algorithms estimate the "TCP friendly" rate by appropriately monitoring the loss rate (p) and round-trip time (rtt) that are the key factors that impact a TCP connection's rate. Techniques described herein attempt to achieve TCP friendly rate control for CBR traffic.

The techniques according to aspects of the present invention also include a TCP friendly rate control for variable bit rate ("VBR") traffic called TCP variable rate control ("TVRC") that is novel and unique. Essentially, TVRC like CBR friendly rate control algorithms calculates the TCP friendly rate from estimates of the loss rate and round-trip time. However, if the connection's application rate happens to be lower than the available TCP friendly rate, TVRC maintains a "credit" for the connection that accounts for the amount of bandwidth yielded by the connection. At a later point, if the application's output rate happens to be larger than the TCP friendly rate, TVRC allows the connections output rate to go beyond the TCP friendly rate as long as the available credit is larger than the excess (and decreases the credit accordingly). Once the accumulated credit is used up, TVRC does not allow the connection's rate to go beyond that of the TCP friendly rate. TVRC connections below the available TCP friendly rate (lagging connections) periodically send packets at a larger rate (either using dummy packets or real data packets that are held back for the purpose) to track the true loss rate p. Losses experienced during such probe periods are used by TVRC connections that are enjoying larger than TCP friendly rates (leading connections) to keep track of the additional service they are receiving. TVRC connections use a TCP subservient congestion control mechanism when they are leading connections.

The above mechanism allows for providing TCP-friendly rate while at the same time providing the best possible rate control mechanism for VBR traffic.

Another aspect of the present invention is bandwidth aware congestion control for reliable point-to-point information delivery over networks with quality of service (QoS) provisioning. When video is delivered in a point-to-point manner (unicast) over an IP network using TCP/IP protocol stack, a significant amount of over-provisioning is required to account for TCP's inefficient rate control.

TCP's LIMD (linear increase multiplicative decrease) algorithm with increase and decrease factors of 1 and 0.5, respectively, is suitable for the best-effort (and larger) Internet environment. However, in any environment where connections or streams are provided with a certain level of quality of service, the LIMD algorithm is no longer acceptable. For example, in a cable IP environment where the cable service provider streams only as many flows (movie streams) as allowed by the capacity of the available pipe, the LIMD algorithm no longer is optimal. Because of these limitations, typical over-provisioning percentages are between 10–50% of the minimum required bandwidth to support the data rate of the flows. For example, if there are 10 flows, each being streamed at 3 Mbps, the amount of raw bandwidth required when using TCP to insure lossless and timely service such that frame display deadlines are not violated can be up to 45 Mbps, although the minimum required bandwidth is only 30 Mbps.

The present system provides a congestion control algorithm that operates in the above environment and that reduces the amount of over-provisioning required and uses the following algorithm.

Instead of starting from a congestion window of 1, as in TCP, the congestion control technique provided according to the present invention starts from a congestion window of $f_{xx}(C_{ideal}/2)$, where $C_{ideal}$ is the ideal congestion window computed as the bandwidth-delay product R*rtt, where rtt is the roundtrip time on the pipe, and R is the data rate of the flow. This reduces the time for the congestion control algorithm to reach the ideal operating rate of R.

For an increase in congestion, the congestion control algorithm of the present invention uses an increase constant of x, which can be the same as in TCP (1).

For a decrease in congestion, the congestion control algorithm of the present invention uses a bandwidth aware decrease mechanism, as opposed to the blind 0.5 decrease used by TCP. Specifically, when a flow experiences a loss, and its current congestion window is $C_{current}$, the flow decreases its congestion window by:

$$f_{yy}(\text{Max}(0, C_{current} - C_{ideal}))$$

Essentially, a flow decreases its congestion window only if the current window size is greater than the ideal window size. If a decision to decrease is made, the amount by which the congestion window is decreased is a function of how much the congestion window is larger than the ideal window size.

The reasoning behind the above algorithms is as follows: fixing the congestion window at a constant value (say ideal) is undesirable because of its consequences (high multiplex frequency–related loss rate). Hence, some kind of adaptation as in TCP is desirable. However, when adaptation is performed, it should take into account the available bandwidth. Decreasing the instantaneous rate ($C_{current}$) by a function of the amount it is overshooting the ideal rate results in heuristically trying to make the average rate of the flow equal to the ideal rate R.

Quality of Service

Another technique that can be used to optimize signal transmission is to optimize according to the quality of service (QOS) required or requested at the receiver/destination/client. Such optimization can take into account actual user requirements, human perception minimum requirement or application specific requirements. Scaling can also be provided based on the size of the network or the number of users on the network. The quality of service requirement seeks to trade off or balance quality, complexity, delay, and data rate. In other words, the QOS techniques of the present invention seeks to minimize delay and maximize throughput. That is, to maximize quality within constraints.

An expert system may be provided to coordinate at least four inputs for quality of service. For example, input for quality of service requirements can be at four different "levels" of the communication between the sender and the receiver: the network, the source, the client application or device, and the user. Such input can also be provided via real time feedback or on a per session basis, on a market (customer) basis or on a market (domain) basis.

Quality of Service primitives (i.e., communication quality factors that can be adjusted according to sender, receiver, client application and user capabilities and requirements) can include, for example, video quality; spatial resolution; temporal resolution; display size, quality and resolution; audio quality; bandwidth; spatial realism; voice control and feedback; start up delay tolerance; midstream latency; etc. or the like. The QOS primitives can be translated into network or system parameters that can actually be implemented by various components of the communication system. Such parameters include video bit rate, video bit error rate profile, video packet loss profile, audio bit rate, audio bit error rate profile, audio packet loss profile, variable/constant/adaptive bit rates, global delay jitter profile, differential jitter profile, etc., or the like.

The QOS primitives can be assessed and translated according to an expert system which can provide input to other aspects, techniques or components of the present invention. The QOS expert system and other aspects of providing adaptation of source, network, client application and user requirements according to quality of service requirements and active feedback are described in U.S. patent application Ser. No. 10/254,685, titled, "System and Method of Quality of Service Feedback between Client and Server Devices," filed on Sep. 26, 2002, which is hereby incorporated by reference for all purposes as if fully set forth herein.

Figure 10:
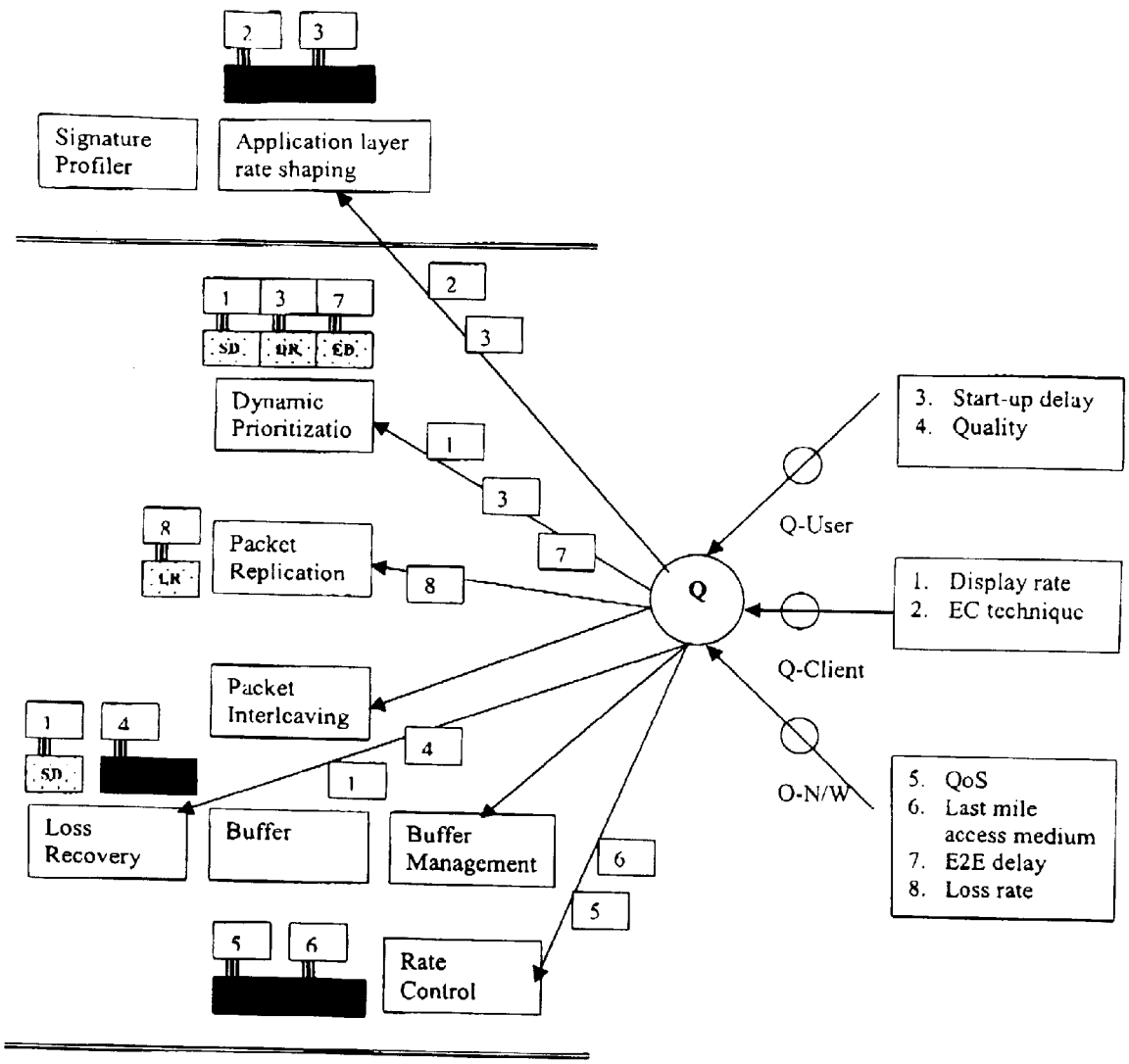
FIG. 10 illustrates adjustment of functionality of a system according to the present invention based on quality of service requirements or requests.

As illustrated in FIG. 10, the QoS expert system may provide QoS signaling to the application layer, the dynamic priority calculation, the packet replication, packet interleaving, loss recovery, buffer manager, and rate control. For example, the application layer may receive QoS information that adjusts the error correction techniques or the start up delay; the dynamic priority calculation may receive information that adjusts the display rate, the start-up delay, or the E2E delay. The packet replicator may include QoS information about the network loss rate. The loss recovery may be affected by QoS information such as the display rate and quality. The rate control may be adjusted according to QoS information about the quality requested by the user and the last mile access medium.

Dynamic Prioritization

Figure 11:
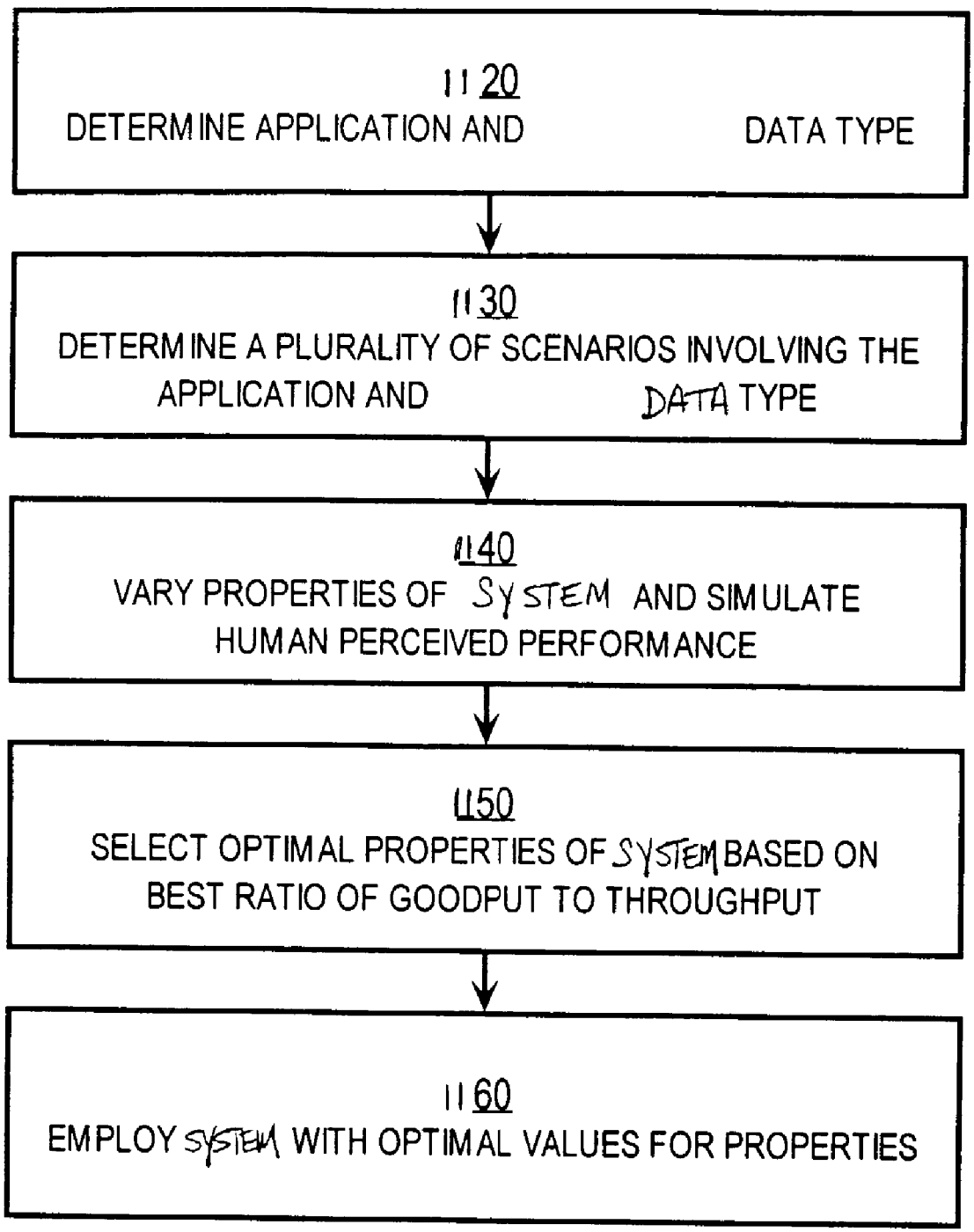
FIG. 11 is a flow diagram illustrating an exemplary process for dynamic prioritization according to one aspect of the present invention.

A process for dynamic prioritization 1109 according to the present invention will be described with reference to FIG. 11. Initially, the prioritization set by the present system is determined based on the prioritization applied to the signal when the signal is first encoded. In step 1120, the application that sends the data and the data types being sent are determined. In step 1130, several scenarios are determined that involve the application and data types. For example, scenarios that define the data rates seen and used by a human, as well as scenarios that determine the number of channels a cable operator can provide within a link with a certain bandwidth links, are defined.

In step 1140, the properties of the signal and network that may be adjusted are varied over a range and human perception is simulated and expressed as a perception performance measure. In step 1150, the optimal values are selected based on the best ratio of "goodput" to throughput. In step 1160, the present system is applied with the adjustable properties set to optimize their values in view of the goodput/throughput ratio. In other words, the present system acts as a broker between the application and the network.

The dynamic prioritization is performed taking into account various attributes of the data and the signal. For example, priority is computed and recomputed based on (1) dependencies between information segments; (2) deadlines for reaching the receiver; (3) client destination/receiver capabilities; (4) connection history between the source and the receiver; and (5) rate mismatches between the source, network and receiver.

Dependencies arise in heterogeneous priority systems in which lower priority packets often depend on higher priority packets such that, if a higher priority packet is dropped, and cannot be recovered, there is no need to transmit the dependent lower priority packet.

Deadlines are the time $t_D$ at which a packet must be received at the destination. If the information packet is not received by the deadline, it may be useless to the receiver. If the packet is transferred at time $t_c$ and the transfer time between the source and the destination is $t_t$, then the expected arrival time of the information at the destination/receiver is $t_c+t_t$. If the deadline time $t_D$ is greater than current $t_c$ plus the transfer time $t_t$ ($t_D>t_c+t_t$), then the packet might as well be dropped since it will arrive at the destination too late to be useful to the destination/receiver. An exception would be if a dependent packet that later will be transmitted can reach the receiver in time in this cast the current packet may still be transmitted even if it will be received after its deadline so that the later dependent packet can be correctly decoded.

Client/destination capabilities include whether the destination/receiver has a strong post-processing capability, such as the ability to perform error concealment. The dynamic prioritization will also take into account if the destination/receiver will automatically drop information if the receive rate is less than the transfer rate.

Connection history accounts for the rate provided by the network and attempts to send information of a quality that will balance destination requirements against expected network bandwidth. The expected network bandwidth may be determined in view of past bandwidth provided on the network, and the system may attempt to stay within an average bandwidth or lowest expected bandwidth. Monitoring and adaptation based on connection history allows the system to provide consistent quality of service to the user.

When there are rate mismatches, the dynamic prioritization takes into account the attributes of individual packets to adjust for the rate mismatches. That is, the dynamic prioritization will look at frames having equal priorities and assess whether each of those frames is likely to reach the destination by the time it is needed by the destination/receiver. The dynamic prioritization will adjust the queue of sending order of the packets based on whether they will be received at the destination/receiver.

Moreover, the user can provide information that is taken into account by the present system so that retransmission or error suppression can be applied to balance the network attributes with the capabilities of the sender and receiver systems and the user quality of service requirements, which can be provided as part of the receiver feedback to the sender.

For example, in the context of MPEG video data, frames can be encoded in three types: intra-frames (I-frames), forward predicted frames (P-frames), and bi-directional predicted frames (B-frames). I-frames are a single image, with no reference to any past or future frames and may be called an anchor frame. A P-frame is encoded relative to the past reference frame such as a past I-frame or past P-frame. A B-frame is encoded relative to the past reference frame, the future reference frame, or both frames. Typically, I-frames require more units, e.g., bits, for transfer than P-or B-frames because, by their nature, I-frames contain more information.

Frames are divided into macroblocks, a unit typically used in motion-compensated compression, which include blocks that contain data such as luminance and chrominance blocks.

Video pictures in MPEG format may be expressed as a "group of pictures" or GOP. A typical GOP includes an I-frame, and related B-frames and P-frames. The order of the frames in a GOP is in the order of display of the frames. However, the corresponding bit stream is typically ordered based on related frames, with the I-frame first. For example, typical GOPs might be:

| $I_1$ | $P_1$ | $B_1$ | $P_2$ | $B_2$ | $B_3$ |
| --- | --- | --- | --- | --- | --- |

The present system adapts to different levels of granularity. For example, in the context of MPEG, the present system may be applied at the frame level, the macroblock level or the block level.

If, for example, the frame $I_1$ is lost, there is no anchor frame containing the necessary information for proper presentation of the remaining frames in the GOP. Depending on the application and presentation of the information, the present system may request retransmission of the I-frame, if the resulting latency is acceptable in view of the application, or the present system may delete the entire GOP, if the resulting choppy presentation is acceptable.

If, for example, a P-frame is lost, the related B-frames are not transmitted.

A dynamic priority calculation receives information from multiple sources, including the application client. Information from the application includes quality of service requirements and information dependencies. Other information on the application client side includes other user parameters besides quality of service requirements, post-processing requirements, application sending rate and error concealment capability at the client.

The dynamic priority calculation also receives information about the data signal, including a signature profile that gives time synchronization information (codes) about the signal to be received, including when data packets are to be expected. Thus, the signature profile assists the client in detecting packet loss and loss profiling and recovery. Also, the dynamic priority calculation can also take into consideration the quality of service requirements provided by the receiver system or by the user at the receiver system.

The dynamic priority calculation also takes into account information about the network and transmission medium, including the bandwidth, transmission rate and time for retransmission of information. Also, the dynamic priority calculation must take into account buffer management and rate control, including differences between the application sending rate, overflow, and congestion management.

As discussed in an example above, P-frame and B-frame information may be dropped if an I-frame is not received. Thus, information in the buffer may be deleted, freeing buffer space, so the actual dropping mechanism may provide drop information to the buffer management. Buffer occupancy information may be useful and taken into account in the dynamic prioritization calculation.

While examples herein relate to the transfer of video data over a network, the principles of the present invention are also applicable to any digital signal, including video, audio and speech, in a packet switched environment in any of a plurality of syntaxes such as MPEG, cable, internet protocols, etc. In fact, the systems of the present invention may be application to any transport scheme, including MPEG 2 and MPEG 4.

The system and method of the present invention may be used in the application layer or transport layer of the five-layer model. The system and method of the present invention is highly adaptive to signal and network requirements and can be adapted accordingly. Underlying the system and method of the present invention is the concept that digital information should permit retransmission in some circumstances and avoid retransmission in other circumstances. For example, retransmission can be avoided when error concealment can fill a hole created in video frame by a lost packet. Also, for some signals that will be presented for a human user, such as video or audio, it is not necessary to retransmit a frame if the absence of such frame will not be perceived by the human user. Similarly, the loss of certain data may not affect the performance of some applications, and thus retransmission may not be necessary. However, the loss of certain data may affect the performance of other time sensitive, not fully reliable applications and retransmission may be necessary.

Potential applications of the present inventions range from pointcasts, which send multimedia data to a single destination, such as on-line video rental, video telecasting, and video on demand (VoD) to multicasts, which send multimedia data to a plurality of devices, such as interactive television (ITV), and video teleconferences, or multiple unicasts.

While the system is described herein with exemplary reference to communication of data having heterogeneous priority between a source and a destination via a network, the techniques of the present system are also applicable in other environments or sub-environments.

In addition, the principles of the present system are applicable not only between client and source, but also between destination and intermediate routers, between intermediate routers, and between intermediate routers and the source. For example, without limitation, the techniques described herein, such as "fast" loss detection, buffer management, flow control, rate control, and dynamic prioritization can be applied between routers.

The techniques, according to the present invention, identifies which attributes of the signal, the network and the presentation are necessary and which may be lost without significant impact on the quality of service required by a particular user.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for providing digital communication, comprising:
   ordering segments of information based on a priority associated with each of the segments of the information, the priority being dynamically computed and recomputed;
   managing flow of the segments into and out of a buffer based on the priority of the segments of information;
   providing congestion control for the flow of the segments, comprising starting with a congestion window that is an ideal window size, increasing the congestion window by a function of a constant x, and decreasing the congestion window by a function of how much the congestion window is larger than the ideal window size;
   adjusting a rate at which information is provided to a communication medium;
   transmitting the information; and
   wherein the priority of the segments of information is computed and recomputed based on information dependencies between the segments.

2. The method of claim 1, wherein the computation and recomputation are further based on whether a certain segment can reach a destination by a specified time $T_D$.

3. The method of claim 2, wherein it is determined that the certain segment cannot reach the destination by the specified time if the specified time $T_D$ is greater than a current time tc plus a transfer time $t_r$.

4. The method of claim 3, wherein the certain segment is dropped if the specified time $T_D$ is greater than a current time $t_c$ plus a transfer time $t_r$.

5. The method of claim 1, wherein the computation and recomputation are further based on capabilities of a destination.

6. The method of claim 5, wherein the capabilities at the destination include whether the destination has a strong post-processing capability.

7. The method of claim 5, wherein the capabilities at the destination include whether the destination can provide error concealment.

8. The method of claim 5, wherein the capabilities at the destination include whether the destination can drop segments of information if a rate of receipt at the destination is less than a transfer rate from the source to the destination.

9. The method of claim 1, wherein the computation and recomputation are further based on connection history between a source and a destination.

10. The method of claim 9, further comprising calculating an expected bandwidth on the communication medium based on an amount of bandwidth previously provided on the communication medium.

11. The method of claim 9, wherein the transmitting the information is performed at a rate within an average bandwidth.

12. The method of claim 9, wherein the transmitting the information is performed at a rate within a lowest bandwidth previously provided on the communication medium.

13. The method of claim 1, wherein the computation and recomputation are further based on rate mismatches between the communication medium and the source.

14. The method of claim 13, further comprising adjusting a rate at which the information is transmitted based on attributes of individual segments of the information.

15. The method of claim 1, wherein the computation of priority takes into account quality of service required at a destination.

16. The method of claim 1, wherein the computation of priority takes into account attributes of the segments of the information.

17. The method of claim 1, wherein the computation of priority takes into account capabilities of the communication medium.

18. The method of claim 17, wherein capabilities of the communication medium include at least one of bandwidth, transmission rate and time for retransmission of a segment of the information.

19. The method of claim 1, wherein the computation of priority takes into account characteristics of the managing of the information held in the buffer.

20. The method of claim 1, further comprising selectively dropping segments of the information.

21. The method of claim 20, wherein dependent segments of the information are dropped if it is determined that the dependent segments depend on a segment that has been dropped.

22. The method of claim 21, wherein one of said segments is dropped if it has a priority lower than another of said segments.

23. The method of claim 1, wherein the rate at which information is provided to the communication medium is calculated using a round trip time and a loss rate on the communication medium.

24. The method of claim 1, wherein the adjusting the rate is based on availability of a communication rate on the communication medium.

25. The method of claim 1, wherein the adjusting of the rate includes accumulating a bandwidth credit for unused bandwidth capacity if the rate at which information is provided to the communication medium is less the rate at which the communication medium is capable of transmitting data.

26. The method of claim 25, wherein the bandwidth credit is the difference between a TCP friendly rate and an actual connection rate on the communication medium.

27. The method of claim 25, further comprising depleting the accumulated credit if the rate at which the information is provided to the communication network is greater than a TCP friendly rate on the communication medium.

28. The method of claim 1, further comprising providing congestion control comprising:
    providing a congestion window of $f_{xx}(C_{ideal}/2)$, where $C_{ideal}$ is the ideal congestion window computed as the bandwidth-delay product R*rtt, where rtt is the roundtrip time on the communication medium and R is the data rate of the flow;
    increasing the congestion control window by an increase function of a constant x if there is an increase in congestion; and
    decreasing the congestion control window by $f_{yy}(Max(0, C_{current}-C_{ideal}))$, where $C_{current}$ is the current congestion control window, if there is a decrease in congestion.

29. The method of claim 1, further comprising adjusting the ordering of the segments, the managing of the flow of segments into and out of the buffer and the adjusting the rate based on quality of service requirements at a destination.

30. The method of claim 29, wherein the quality of service requirements are provided by a user at the destination.

31. The method of claim 1, further comprising adjusting the ordering of the segments, the managing of the flow of segments into and out of the buffer and the adjusting the rate based on capabilities of devices at a destination.

32. The method of claim 1, further comprising adjusting the ordering of the segments, the managing of the flow of segments into and out of the buffer and the adjusting the rate based on capabilities of the communication medium.

33. The method of claim 1, further comprising providing time synchronization information about the segments to the destination.

34. The method of claim 1, further comprising providing priority signature information about the segments to the destination.

35. A method for providing digital communication, comprising:
    ordering segments of information based on a priority associated with each of the segments of the information, the priority being dynamically computed and recomputed;
    managing flow of the segments into and out of a buffer based on the priority of the segments of information;
    providing congestion control for the flow of the segments, comprising starting with a congestion window that is an ideal window size, increasing the congestion window by a function of a constant x, and decreasing the congestion window by a function of how much the congestion window is larger than the ideal window size;
    adjusting a rate at which information is provided to a communication medium; and
    transmitting the information;
    wherein managing the information held in a buffer further comprises,
        predicting the priority of incoming segments of information to be placed in the buffer based on information dependencies between segments and
        determining whether the buffer has sufficient capacity to receive all of the incoming information segments.

36. The method of claim 35, wherein the managing the information held in the buffer further comprises:
    dropping segments of information if it is determined that the buffer does not have sufficient capacity to receive all of the incoming information segments.

37. The method of claim 36, wherein the segments of information that are dropped have a lower priority than the incoming segments of information.

38. The method of claim 35, further comprising:
- determining whether segments of information in the buffer have a priority that is one of the same as and lower than the priority of at least one of the incoming segments of information; and
- dropping at least one segment of information from the buffer having priority lower than the at least one incoming segment before the at least one incoming segment is received by the buffer if it is determined that the at least one segment of information in the buffer has priority that is one of the same as and lower than the priority of the at least one of the incoming segments.

39. A method for providing digital communication, comprising:
- ordering segments of information based on a priority associated with each of the segments of the information, the priority being dynamically computed and recomputed based on information dependencies between the segments of information;
- managing flow of the segments into and out of a buffer based on the priority of the segments of information;
- providing congestion control for the flow of the segments, comprising starting with a congestion window that is an ideal window size, increasing the congestion window by a function of a constant x, and decreasing the congestion window by a function of how much the congestion window is larger than the ideal window size;
- transmitting the information segments via a communication medium;
- accumulating a bandwidth credit for unused bandwidth capacity if the rate at which information is provided to the communication medium is less than the maximum rate at which the communication medium is to transmit data; and
- adjusting the rate at which information is provided to a communication medium based on said accumulated bandwidth credit.

* * * * *